United States Patent [19]
Meador et al.

[11] 3,993,944
[45] Nov. 23, 1976

[54] MOVABLE OIL MEASUREMENT COMBINING DUAL RADIO FREQUENCY INDUCTION AND DUAL INDUCTION LATEROLOG MEASUREMENTS

[75] Inventors: Richard A. Meador; Percy T. Cox; Larry W. Thompson, all of Houston, Tex.

[73] Assignee: Texaco Inc., New York, N.Y.

[22] Filed: Dec. 22, 1975

[21] Appl. No.: 643,421

[52] U.S. Cl. .................................................. 324/6
[51] Int. Cl.² .................. G01V 3/18; G01V 3/10
[58] Field of Search .......................... 324/1, 6–8

[56] References Cited
UNITED STATES PATENTS

| | | |
|---|---|---|
| 3,075,142 | 1/1963 | Albright et al. .................. 324/1 |
| 3,166,708 | 1/1965 | Millican ............................ 324/1 |
| 3,180,141 | 4/1965 | Alger ............................... 324/1 X |
| 3,187,252 | 6/1965 | Hungerford ....................... 324/6 |
| 3,551,797 | 12/1970 | Gouilloud et al. ................. 324/6 |
| 3,849,721 | 11/1974 | Calvert ............................. 324/6 |
| 3,891,916 | 6/1975 | Meador et al. ................... 324/6 |
| 3,893,020 | 7/1975 | Meador et al. ................... 324/6 |
| 3,893,021 | 7/1975 | Meador et al. ................... 324/6 |

Primary Examiner—Gerard R. Strecker
Attorney, Agent, or Firm—Carl G. Ries; Thomas H. Whaley; William J. Beard

[57] ABSTRACT

An exemplary embodiment of the invention includes method for measuring the dielectric constant and resistivity of the invaded zone and the virgin formation in a fluid filled well bore hole. Dual induction laterolog measurements are employed to determined $R_t$ and $R_{xo}$. Dual spaced radio frequency dielectric induction log measurements are employed to determine $\epsilon_t$ and $\epsilon_{xo}$. By combining these measurements, a movable oil plot may be obtained in highly resistive formations.

20 Claims, 3 Drawing Figures

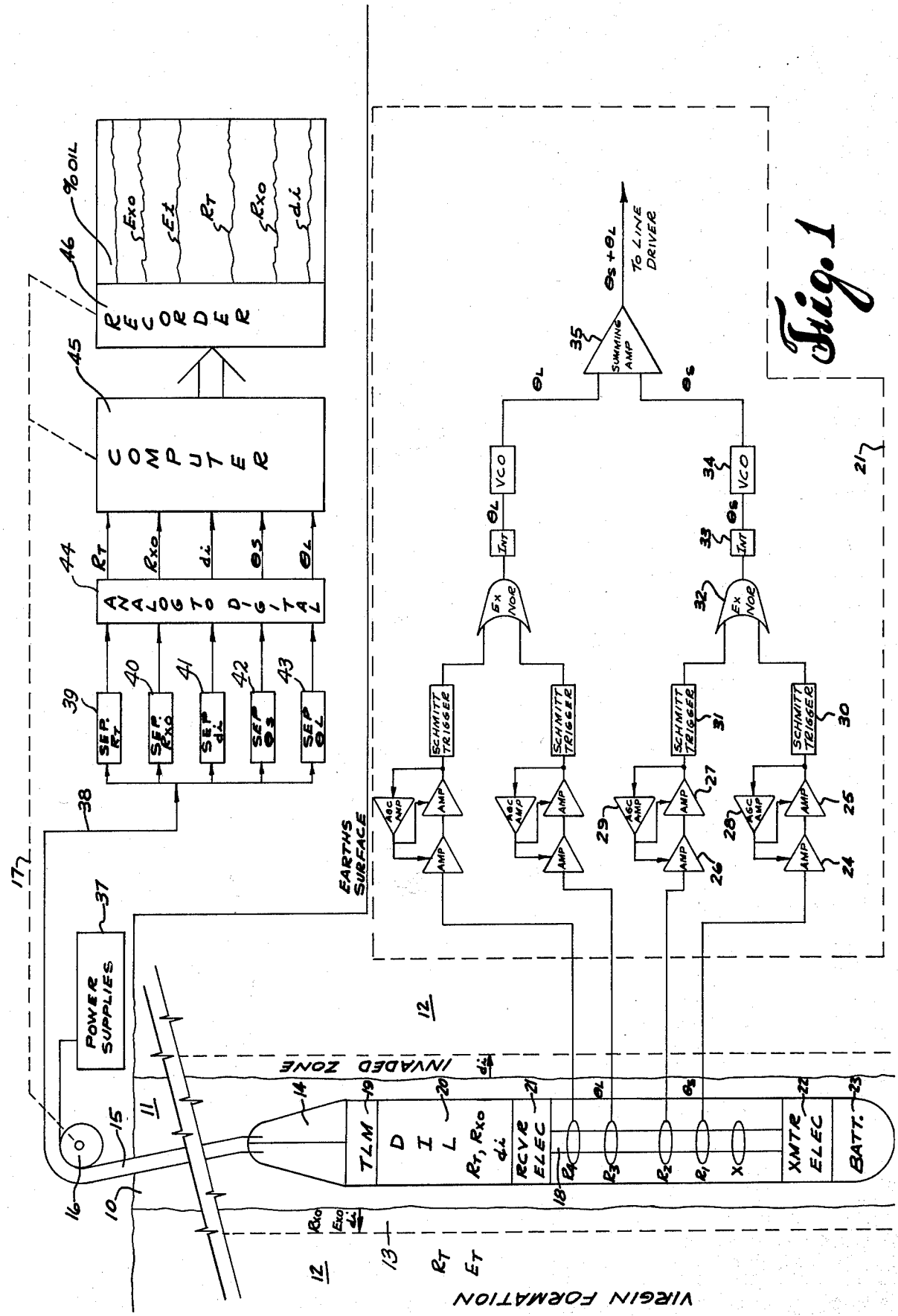

MOVABLE OIL MEASUREMENT COMBINING DUAL RADIO FREQUENCY INDUCTION AND DUAL INDUCTION LATEROLOG MEASUREMENTS

FIELD OF THE INVENTION

This invention relates to well logging methods for determining the electromagnetic properties of earth formations in the vicinity of a well bore hole and, more particularly, relates to well logging techniques combining conventional induction and resistivity logging measurements together with improved radio frequency dielectric well logging methods for determining the effects of fluid invasion from the bore hole on the measurement of earth formation dielectric constant.

BACKGROUND OF THE INVENTION

Recent progress has been made in the measurement of the electromagnetic characteristics of earth formations at radio frequencies. Such measurements are valuable in distinguishing fresh water bearing earth formations from oil formations in open well bore holes. For example, dual radio frequency measurements of dielectric constant and resistivity of bore hole media are disclosed in U.S. Pat. No. 3,891,916 which include the measurement of the amplitude of the total electromagnetic field at two different radio frequencies. These measurements are combined in order to simultaneously determine the resistivity and dielectric constant of the earth media surrounding a well bore hole. Also in U.S. Pat. Application Ser. No. 531,562 filed Dec. 11, 1974, and assigned to the assignee of the present invention, a technique for combining a radio frequency dielectric well log with a conventional deep induction well logging measurement in order to accurately determine the resistivity and dielectric constant of earth formation media in the vicinity of a well bore hole is disclosed.

While the radio frequency measurement of the dielectric constant and resistivity of earth formations in the vicinity of a well bore has proven to be very useful, particularly in areas wherein the well drilling fluid is fresh water or oil base mud, and where the earth formations surrounding the well bore are primarily fresh water filled or oil filled, these techniques have not proven to be entirely satisfactory in the case of saline drilling fluid filled well bores. Historically, the use of saline well drilling fluids has led to similar problems in the interpretation of conventional induction and resistivity well logging measurements. These problems occur in conventional electrical resistivity and induction logging measurements due to the invasion of highly porous earth formations by the drilling fluid from the bore hole. This bore hole fluid "invades" or penetrates the highly porous formations to some depth which is functionally related to the porosity, water and oil saturation of the formations and the permeability of these earth formations.

The effect of the invasion of conductive bore hole fluids into the invaded zone surrounding the bore hole in highly porous and permeable earth media leads to the masking of the true resistivity of the "virgin" or uninvaded formations in the vicinity of the bore hole. Because of this invasion problem, in the past conventional resistivity and induction logging apparatus has been designed in proliferation in order to be able to measure and distinguish the effects of the invasion fluid on the resistivity of the earth formations in the vicinity of the bore hole.

Focused induction logging instruments and resistivity measuring electrode instruments having different radial depths of investigation from the bore hole into the earth media surrounding the bore hole have been produced. Such instruments have been used in an attempt to measure the resistivity of the invaded zone (usually labeled $R_{xo}$) and the resistivity of the virgin or uninvaded formation (usually labeled $R_t$).

At the radio frequencies of interest with respect to radio frequency induction dielectric well logging the conductivity of the earth formations surrounding the bore hole is, in principle, intimately related to the measurement of the dielectric constant of the earth formation surrounding the well bore. Due to the possible "screening effect" of a conductive medium on the electromagnetic waves which are propagated from the transmitter coil of such a measurement system the amplitude of induced currents at the receiver coil or coils of such a system can be affected. If an amplitude measurement alone is relied on, as in the example of the previously mentioned patent, this screening effect can influence the received amplitude of the electromagnetic field at the receiver coils due to the attenuation of the transmitted signal. If the magnitude of the received signal is minimized by the effects of invasion, then it is apparent to one skilled in the art that it is more difficult to make the measurement with a small amplitude signal than it would be with a larger amplitude signal at the receiver coils.

Similarly, it the derivation of the theory of measurement of the dielectric constant at radio frequencies, it may be shown that both the resistivity and dielectric constant of the invaded earth formations affect the total field amplitude or relative phase shift of the electromagnetic field induced in the receiver coils by a transmitted signal from a radio frequency transmitter. Hence, both the resistivity and dielectric constant of the invaded zone must be accurately known in order to determine accurately the dielectric constant of the virgin formation earth material surrounding the bore hole. The foregoing patent and patent application offer alternative techniques for simultaneously determining both the resistivity and dielectric constant of the earth media in the vicinity of the bore hole. However, these techniques do not take into account the effects due to the invasion phenomena.

BRIEF DESCRIPTION OF THE INVENTION

The present invention concerns alternative techniques for simultaneously determining the resistivity and dielectric constant of earth formations in the vicinity of a bore hole. In practicing the techniques of the present invention, the effects of the invasion of highly conductive bore hole fluids from the well bore into the highly porous and permeable earth media surrounding the bore hole are taken into account. In an invaded zone having a depth of invasion $d_i$, a resistivity $R_{xo}$ and a dielectric constant $\epsilon_{xo}$, the properties of the zone are investigated by both conventional induction and resistivity logging techniques together with a radio frequency induction dielectric logging technique having a relatively shallow depth of investigation essentially including only this zone. Further, the resistivity of the virgin formation $R_t$ is measured by conventional induction and resistivity logging techniques having a relatively deep depth of investigation and simultaneously by a radio frequency induction dielectric measurement technique also having a relatively deeper depth of investigation. The deeeper radial depth of investigation enables the dielectric log to respond to the dielectric constant $\epsilon_t$ of the virgin formation. Thus, by considering both the invaded zone and the virgin formation with separate techniques utilizing the novel concepts of the present invention, both the resistivity and dielectric properties of the invaded zone and of the virgin formation may be derived.

By making the simultaneous determinations of the resistivity and dielectric constants of both the invaded zone and the virgin formation, the effects of conductive drilling fluid invasion from the bore hole into the earth formations in the vicinity of the bore hole may be taken into account. Also in practicing the concepts of the invention, along with the previously known relationship for movable oil which may be determined from measuring the resistivity of the invaded zone and the resistivity of the virgin formation, a separate and independent estimate of the percentage of movable oil based on the measurement of the dielectric constant of the invaded zone and the dielectric constant of the virgin formation may be derived. In this manner, measurements which have heretofore been unavailable in any prior art well logging technique are furnished.

Briefly, in accordance with the concepts of the present invention, a well logging system is provided which includes a induction-laterolog dual inductionlaterolog portion as known in the prior art. This portion comprises a deep induction, a shallow induction, and a laterolog measurement of the resistivity $R_{xo}$ of the invaded zone, the resistivity $R_t$ of the virgin formation, and the diameter of invasion $d_i$. Moreover, the well logging system of the present invention includes a dual radio frequency induction well logging portion which measures the relative phase shift of the total electromagnetic field at a single selected radio frequency at a relatively shallow depth and at a relatively deeper depth of investigation in the virgin formation. These measurements, when combined according to relationships disclosed herein, yield $\epsilon_{xo}$ the dielectric constant of the invaded zone, and $\epsilon_t$ the dielectric constant of the virgin formation. When these measurements are combined according to an independent relationship given herein, the percentage of movable oil may be inferred from the difference in the dielectric constants of the invaded zone and the virgin formation. This derivation is independent of the known prior art similar relationship for the resistivity of the invaded zone and resistivity of the virgin formation.

The novel aspects and advantages of the present invention may be more fully appreciated by reference to the following detailed description of the invention when taken into conjunction with the accompanying drawings.

BRIEF DESCRIPTION OF THE DRAWINGS

FIG. 1 is a schematic diagram illustrating a well logging system in accordance with the concepts of the present invention.

DETAILED DESCRIPTION OF THE INVENTION

Figure 3:
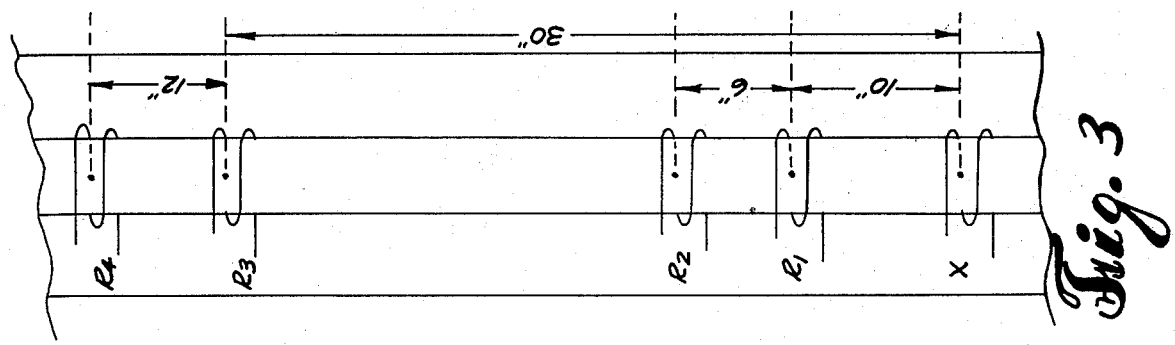
FIG. 3 is a schematic illustration of the coil spacing of the radio frequency dielectric induction logging portion of the well logging system of the present invention.

Induction and electrical resistivity logs have proven useful in the past in determining earth formation resistivity and thereby locating oil bearing sands in the vicinity of a well bore hole. However, due to the fact that fresh water sands and oil sands have similar high resistivities, these logs (conventional induction and resistivity) cannot always adequately detect the difference between oil and fresh water (or slightly saline water) filling the pores of the earth formations in the vicinity of the bore hole. As disclosed in the previously mentioned patent and patent application, however, the possibility exists at radio frequencies of measuring simultaneously th formation electrical conductivity and formation permittivity (or dielectric constant) which can provide a means for distinguishing these types of liquid bearing strata. Hydrocarbons have a characteristically low dielectric constant $\epsilon_r$ less than 5. On the other hand, fresh water has a relatively high dielectric constant $\epsilon_r$ approximately equal to 80. The permittivity or dielectric constant of a material $\epsilon$ is defined as the natural electrical polarization of this material. In the foregoing and following descriptions, the terms relative permittivity and dielectric constant are used synonymously. These quantities are related to the permittivity of free space $\epsilon_o$ by the relationship given in equation 1:

$$\epsilon = \epsilon_r \epsilon_o \qquad 1.$$

where $\epsilon_o = 8.854$ picofarads per meter, the permittivity of free space.

As previously discussed the invasion of conductive well bore fluid during the drilling operation into highly porous and permeable media in the vicinity of the bore hole forms the area known as the invaded zone. In the invaded zone some of the hydrocarbon or other interstitial liquid filling the pore spaces of the earth media has been replaced by the conductive drilling fluid. This alters the electrical resistivity characteristics of the invaded zone and also influences the measured dielectric constant of the invaded zone. In order to apply the principles of radio frequency dielectric induction logging in order to obtain a knowledge of the fluid content of the pore spaces of the media surrounding the bore hole, it is highly desirable to accurately know the depth of invasion $d_i$ and the electrical resistivity $R_{xo}$ (or conductivity) of the invaded zone.

A particularly suitable measurement of the depth of investigation $d_i$, the electrical resistivity of the invaded zone $R_{xo}$, and the resistivity of the virgin formation $R_t$, has been provided in the past by obtaining measurements of these quantities with the well logging system known as dual induction laterolog. In the present invention, measurements of these quantities made with this type of instrument are combined with radio frequency dielectric induction measurements made at two different depths of investigations to simultaneously determine $\epsilon_{xo}$, the dielectric constant or permittivity of invaded zone, and $\epsilon_t$ the dielectric constant of the virgin formation. This information in turn can lead to resolution of the question of whether the earth formation pore spaces are filled with fresh water or oil. Heretofore, it has been relatively unreliable to distinguish fresh water from oil on the basis of solely dual induction laterolog information alone.

For an understanding of the operating principles of the dual induction laterolog system in determining $R_t$, $R_{xo}$ and $d_i$ reference may be had to "Schlumberger Log Interpretation," Volume 1 *Principles*, and Volume 2 *Applications* both of which are published by Schlumberger Limited, 277 Park Avenue, New York, New York 10017. It will suffice to state herein that dual induction logging signals are developed by this instrument which indicate the conductivity (resistivity) of the earth formation at two different radial depths from the well bore into the formation. This information is combined with a resistivity laterolog measurement to yield the three quantities of interest with respect to the present invention.

The theory of radio frequency dielectric induction logging is explained with more particularity in U.S. Pat. No. 3,891,916 and the previously referenced copending patent application which is assigned to the assignee of the present invention. It will suffice herein to state that if the electromagnetic field theory equation of the influence of a time varying electromagnetic field generated in the well bore hole upon any currents induced in the formation surrounding the well bore hole is analyzed, that it is possible to derive the dielectric constant of the invaded zone $\epsilon_{xo}$, and the virgin formation $\epsilon_t$ by measuring the relative phase shift of the electromagnetic field at two different longitudinally spaced distances from a transmitting coil located in the well bore hole.

Generally speaking, the distance from the transmitting coil to the spaced receiving coils at which the relative phase shift measurement is conducted will influence the relative depth of investigation of the electromagnetic signals into the earth formation media surrounding the well bore hole. In general, the longer this spacing distance between the transmitting coil and the receiving coils the deeper will be the relative depth of investigation into the media surrounding the bore hole. By combining the relative phase shift information with the dual induction laterolog measurements of resistivity, the quantities of interest in the present system may be determined.

Further, if a knowledge of a $\epsilon_t$ (the true information dielectric constant) is obtained, this allows one to calculate the relative amount of oil in the virgin formation. A knowledge of the invaded zone dielectric constant allows the calculation of the irreducible oil saturation of that zone. Having both the invaded zone dielectric constant $\epsilon_{xo}$ and the virgin formation dielectric constant $\epsilon_t$ it may be shown that a direct measurement of the percentage of movable oil in the formation is given by the expression of equation (2):

$$\% \text{ movable oil} = \frac{\epsilon_{xe}^k - \epsilon_t^k}{\phi (\epsilon_w^k - \epsilon_o^k)} \times 100 \qquad (2)$$

In equation (2) $\epsilon_{xo}$ is the invaded zone dielectric constant, $\epsilon_t$ is the virgin formation dielectric constant, $\epsilon_w$ is the dielectric constant of water, $\epsilon_o$ is the dielectric constant of oil, $\phi$ is the porosity and $k$ is a formation matrix cementation factor which may be empirically derived.

Figure 2:
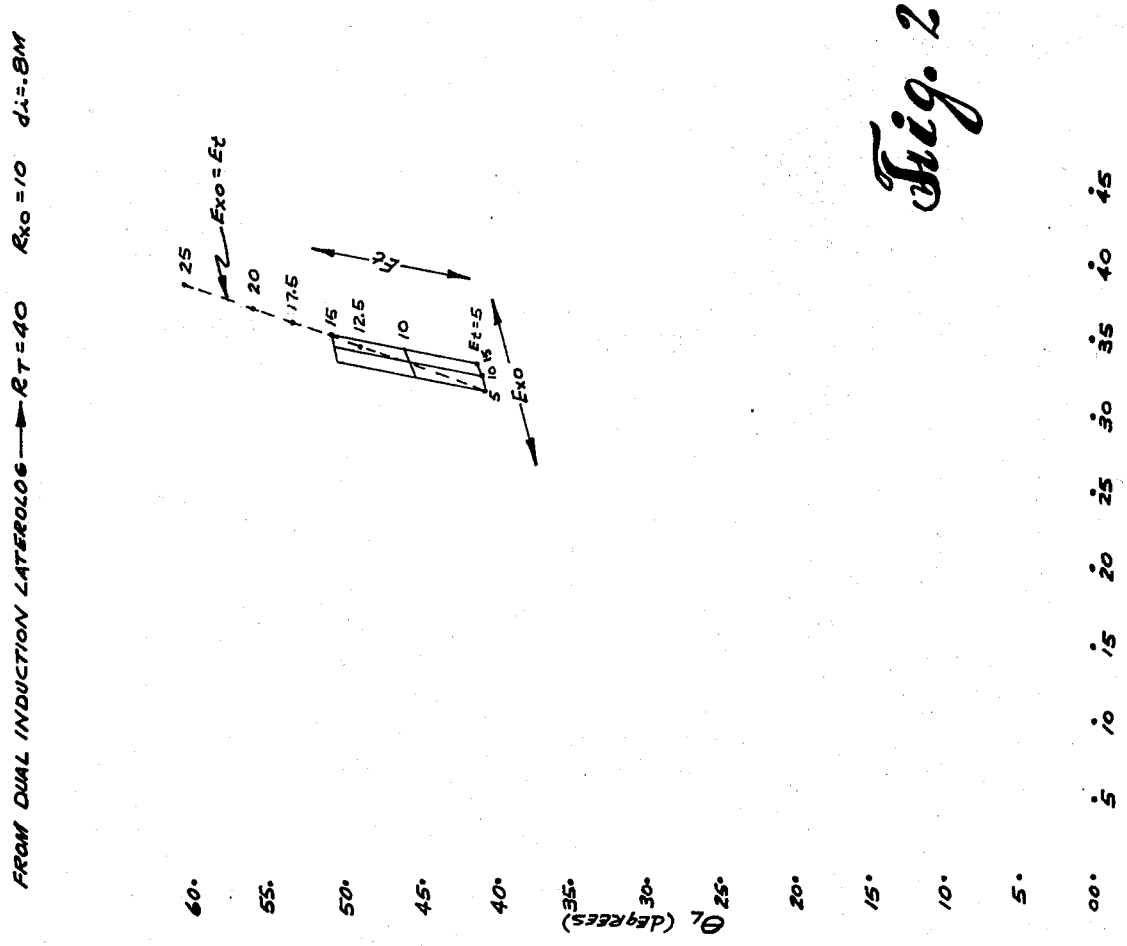
FIG. 2 is a graphical relationship illustrating the derivation of the dielectric constant of the invaded zone and the virgin formation as measured by phase shift differences between a short spaced and long spaced coil pair of radio frequency dielectric induction coils.

If it is assumed that the depth of invasion $d_i$, the resistivity of the invaded zone $R_{xo}$, and the resistivity of the virgin formation $R_t$, are known, then it is possible to construct, on the basis of theoretical calculations or calibration curves from known conditions in test bore holes, a plurality of charts or graphs of the nature of that illustrated in FIG. 2 of the application.

Referring now to FIG. 2, a cross-plot of the relative phase shift at a short spaced pair of receiver coils and a long spaced pair of receiver coils from a radio frequency transmitter coil is illustrated for an operating frequency of 30 megahertz. It will be observed from FIG. 2 that a family of roughly parallel curves are formed in this cross-plot for different values of $\epsilon_{xo}$ and $\epsilon_t$ for a given set of parameters $R_t$, $R_{xo}$ and $d_i$. Of course, for each different set of resistivity and depth of invasion characteristics, a different family of parallel (or roughly parallel) curves are generated on a cross-plot analogous to the cross-plot of FIG. 2. The specific example of FIG. 2 is shown for illustrative purposes only. For example, in a practical measurement situation, a set of such cross plots would be generated for approximately 20 different values of $R_t$, approximately 10 different values of $R_{xo}$, and approximately 10 different values of $d_i$. Considering all the permutations and combinations of these parameters then, approximately 2,000 such cross-plots would be required to cover a practical range of conditions to be encountered in well bore holes.

The data of such cross plots, whether theoretically or empirically derived, may be stored in a tabular form in the memory of a general purpose digital computer such as that which will be described subsequently with respect to FIG. 1. Appropriate interpolation techniques may then be utilized to extract the values of $\epsilon_{xo}$ (dielectric constant of the invaded zone) and $\epsilon_t$ (dielectric constant of the virgin formation) once the values of $R_t$, $R_{xo}$, and $d_i$ are known for a particular region of the well. A small general purpose digital computer can be programmed in an appropriate compiler language such as FORTRAN to perform the necessary calculations to determine $\epsilon_{xo}$ and $\epsilon_t$. Similarly the percentage of movable oil from equation 2 may then be obtained. Such a small general purpose machine could be, for example, a PDP 12 computer as furnished by the Digital Equipment Corporation of Cambridge, Massachusetts.

From the foregoing discussion and consideration of the graphical relationship of FIG. 2, it is seen that is a simultaneous measurement by a dual induction laterolog, for example, is used to provide a measurement of $R_t$, $R_{xo}$, and $d_i$, then the dielectric constant of the invaded zone and the virgin formation may be accurately determined by the measurement of the relative phase shift of the radio frequency electromagnetic field at two sets of longitudinally spaced coils in a well bore hole. A system which is suitable for obtaining such relative phase shift measurements while simultaneously obtaining dual induction laterolog measurements of $R_t$, $R_{xo}$, and $d_i$ is illustrated schematically in FIG. 1.

Referring now to FIG. 1, a well bore hole 10 filled with a drilling fluid 11 is shown penetrating earth formations 12. An invaded zone 13 (delineated by the dotted lines) is formed by the invasion of conductive well fluid 11 from the bore hole into the porous and permeable formations surrounding it. The virgin formation material 12 has a characteristic resistivity $R_t$ and a characteristic dielectric constant $\epsilon_t$ which have been relatively uneffected by the drilling operation. However, the invaded zone 13 has a different resistivity $R_{xo}$, and dielectric constant $\epsilon_{xo}$ to a depth $d_i$ away from the bore hole, due to the invasion of this zone by the conductive well fluid. A well logging sonde 14 is shown suspended in the bore hole 10 by means of an armored well logging cable 15 which is typically spooled on the surface on a drum or spool (not shown).

The well logging cable 15 passes over a sheave wheel 16 which may be electrically or mechanically coupled to other surface equipment as indicated by the dotted line 17 to provide depth information of the location of the sonde 14 in the bore hole to the surface equipment. This depth information allows depth correlation of the electrical measurements made in the bore hole from the instrumentation carried by the sonde 14 and allows this information to be used in the manner to be subsequently described to determine $R_{xo}$, $R_t$, $\epsilon_{xo}$, $\epsilon_t$ and $d_i$. The well logging cable 15 contemplated for use with the present invention may typically comprise an armored tri-axial (or armored co-axial) cable having a single centric conductor insulated from a surrounding conductive shield layer of material. The shield layer is in turn insulated from the outer or double armor layer surrounding the cable core. It will be appreciated by those skilled in the art, however, that armored multi-conductor well logging cable may be utilized in the practice of the present invention if desired.

The downhole sonde comprises a fluid tight, hollow body 14 preferably constructed of a non-conducting material, such as fiberglass or the like, and having a central mandrel portion thereof 18 which is also constructed of a non-conductive material such as fiberglass or the like. The upper end of the sonde is equipped with a telemetry system 19 for transmitting signals from the downhole sonde to the surface equipment. Just below the telementary system 19 is located a conventional dual induction laterolog arrangement 20. The details of this are not shown in the drawing of FIG. 1, but may be had by reference to the previously referenced Schlumberger Well Log Interpretation Manuals.

Below the dual induction laterolog portion 20 of the instrument (and shown in more detail) is the radio frequency induction dielectric log portion of the instrument. The radio frequency induction dielectric log portion of the instrument includes receiver electronics (illustrated schematically at 21) which are associated with two pairs of longitudinally spaced receiver coils labeled $R_1$, $R_2$, $R_3$ and $R_4$ in FIG. 1. A single transmitter coil labeled X is also provided in the induction dielectric log portion of the system. A transmitter electronics portion 22 (which is illustrated only schematically in FIG. 1) is powered by a battery 23 which is carried at the lower end of the sonde 14. Details of this transmitter electronics may be had by reference to U.S. Pat. No. 3,891,916. While the frequency range of interest for making the measurements of the present invention includes the frequency range from 10 to 60 megahertz, the transmitter illustrated in the embodiment of FIG. 1 is preferably operated at a frequency of about 30 megahertz for practicing the concepts of the present invention. Operation at other frequencies is not precluded, however.

Referring now to FIG. 3, the coil spacings of the radio frequency dielectric log portion of the sonde in FIG. 1 are illustrated in more detail. The transmitter coil X is spaced approximately 10 inches from receiver coil $R_1$. Receiver coils $R_1$ and $R_2$ are spaced approximately 6 inches apart. This spacing configuration allows receiver coils $R_1$ and $R_2$ to sense a phase shift which is primarily influenced by the invaded zone of the earth formations surrounding a typical sized well bore hole. Receiver coil $R_3$ is situated approximately 30 inches from the transmitter coil X and receiver coils $R_3$ and $R_4$ are spaced approximately 12 inches apart as illustrated in FIG. 3. This spacing configuration allows the relative phase shift of the electromagnetic field measured between receiver coils $R_3$ and $R_4$ to be primarily influenced by the characteristics of the virgin formation zone of FIG. 1.

Referring again to FIG. 1, the portion of the figure shown in the dotted box 21 to the right of the downhole sonde corresponds to the receiver electronics portion 21 illustrated schematically on the sonde itself. This instrumentation is used to derive a measurement of the relative phase shift of the electromagnetic fields produced by the transmitter signal in the earth formations adjacent to the well bore hole. The measurement of the relative phase shift angle of the electromagnetic field between each of the two pairs of longitudinally spaced receiver coils are made in precisely the same manner. Therefore, a detailed description of the measurement of the relative phase shift between only one pair of the coils will suffice to explain the operation of the system.

The time varying electromagnetic field induced in receiver coil $R_1$ is coupled to a pair of gain controlled amplifiers 24 and 25. Similarly, the time varying electromagnetic field induced in receiver coil $R_2$ is coupled to a pair of gain controlled amplifiers 26 and 27. The gain of amplifier stages 24 and 25 is controlled by a feedback signal coupled through AGC (Automatic Gain Control) amplifier 28 which samples a portion of the output signal of amplifier 25 and uses this to generate a gain control signal which keeps approximately a constant output level signal from the amplifier stage 25. Similarly, AGC amplifier 29 samples a portion of the output signal of amplifier stage 27 and supplies a gain control signal to control the gain of amplifier stages 26 and 27 to produce approximately a constant output.

The approximately sinusoidal wave form output from amplifier stage 25 is coupled to a Schmitt trigger circuit 30. This circuit comprises an emitter coupled logic gate having a very steep rise time. The Schmitt trigger circuit 30 thus transforms the approximately sinusoidal output of the amplifier stage 25 to a very sharp sided square wave form. Similarly, the approximately sinusoidal output of amplifier stage 27 is coupled to a second emitter coupled logic gage 31 which is also employed as a Schmitt trigger. Similarly this circuit shapes this waveform into a very steep sided approximately square wave pulse. The output of Schmitt triggers 30 and 31 are supplied as input to an exclusive NOR gate 32 which is also an emitter coupled logic circuit having a very fast response time. The action of exclusive NOR logic gate 32 is to produce an output voltage pulse whose duration is proportional to the relative phase shift of the electromagnetic field between the receiver coils $R_1$ and $R_2$. This signal is supplied to a conventional integrator circuit 33 which integrates this square wave form to produce an output voltage $\theta_s$ which is proportional to the relative phase shift of the electromagnetic field between the receiver coils $R_1$ and $R_2$.

A voltage controlled oscillator (VCO) 34 is supplied with the output of the integrator 33. The operational frequency of VCO 34 is determined by the magnitude of the voltage input $\theta_s$. The voltage controlled oscillator 34 thus produces a frequency modulated signal between two previously chosen limits of frequency which is representative of the relative phase shift of the electromagnetic field between receiver coils $R_1$ and $R_2$.

This signal is supplied to a summing amplifier 35 where it is summed with a corresponding frequency modulated signal $\theta_L$ between two different frequency limits. This $\theta_L$ signal corresponds to the relative phase shift of the electromagnetic field between the longer spaced receiver coil pair $R_3$ and $R_4$. Thus, the output of summing amplifier 35 comprises a signal comprising a pair of frequency modulated signals $\theta_s$ and $\theta_L$ which is supplied to line driver circuitry in the telementary section 19 of the downhole equipment.

Similarly, the measurement signals from the dual induction laterolog portion 20 of the downhole sonde which are representative of $R_t$, $R_{xo}$ and $d_i$ are supplied to the telementary section 19 for transmission to the earth via well logging cable 15.

The foregoing description of the downhole equipment has neglected to describe in detail the power for the operation of the telementary portion 19, the dual induction laterolog portion 20 and the receiver electronics portion 21 of the instrument because these power supplies may be of conventional types known in the art. Operative power for the downhole equipment, except for the transmitter portion 22 thereof, is supplied from a surface power supply source 37 via the well logging cable 15.

At the surface the frequency modulated component signals from the well logging cable center conductor 38 are supplied to a plurality of separator circuits 39, 40, 41, 42 and 43. These circuits may comprise, for example, high Q bandpass filter circuitry which is capable of effectively filtering each of the five component signals from the sum signal which is present on the cable conductor 38. The five separate signals representative of $R_t$, $R_{xo}$, $d_i$, $\theta_s$ and $\theta_L$ are supplied to analog to digital converter 44. This circuit converts these signals into appropriate digital representations thereof. It will be recalled that these signals were supplied from the downhole equipment in the form of frequency modulated signals each of which operated within a separate relatively narrow frequency band. Thus, five output signals from analog to digital converter 44 representative of the five quantities $R_t$, $R_{xo}$, $d_i$, $\theta_s$ and $\theta_L$ are furnished to the general purpose digital computer 45 which may be of the type previously described. The computer 45 then combines these measurements in the manner previously discussed with respect to FIG. 2 to derive signals representative of the percentage of oil saturation, $\epsilon_{xo}$, $\epsilon_t$, $R_t$, $R_{xo}$ and $d_i$. These outputs are supplied to a recorder 46, which may be of a type conventional in the art such as a strip chart or film chart recorder, where they are recorded as a function of bore hole depth. The depth information is supplied from the sheave wheel 16 is electrically or mechanically linked to the computer 45 and the recorder 46 for this purpose.

In summary, according to the concept of the present invention, conventional dual induction laterolog measurements of the resistivity of the invaded zone and virgin formation together with the depth of investigation are combined with relative phase shift measurements of the electromagnetic field at a dual pair of spaced receiver coils from a radio frequency transmitter coil operating at a frequency of approximately 30 megahertz. By combining the relative phase shift measurements at the dual pair of spaced receiver coils according to predetermined relationships, the dielectric constant of the invaded zone and virgin formation may be determined. This information may be used to compute the percentage of movable oil in the formation.

The foregoing disclosure and description of the invention is illustrative and exemplary thereof, and various changes in the size, shape and materials as well as in the details of the illustrated construction may be made within the scope of the appended claims without departing from the spirit of the invention.

I claim:
1. A method for determining the electromagnetic properties of earth formations in the vicinity of a well bore hole, the earth formations being invaded by conductive drilling fluid to form an invaded zone to some depth of invasion, comprising the steps of:
   determining by the use of conventional induction and resistivity well logs the resistance $R_{xo}$ of the invaded zone, the resistance $R_t$ of the uninvaded formation, and the depth of invasion $d_i$, as a function of depth in the well bore;
   measuring between a first spaced pair of locations in the well bore the relative phase shift of electromagnetic waves at a radio frequency in the range of 10-60 megahertz at a first relatively shallow radial depth of investigation primarily affected by the invaded zone and generating signals $\theta_s$ representative thereof as a function of bore hole depth;
   measuring between a second spaced pair of locations in the well bore the relative phase shift of electromagnetic waves at a radio frequency in the range of 10-60 megahertz at a second relatively deeper radial depth of investigation affected primarily by the uninvaded formation and generating signals $\theta_L$ representative thereof as a function of bore hole depth; and
   for each measured $R_{xo}$, $R_t$ and $d_i$, combining the signals $\theta_s$ and $\theta_L$ according to a predetermined relationship to derive indications of $\epsilon_{xo}$, the dielectric constant of the invaded zone, and $\epsilon_t$, the dielectric constant of the uninvaded formation as a function of bore hole depth.

2. The method of claim 1 and function including the step of recording the representations of $R_{xo}$, $R_t$, $d_i$, $\epsilon_{xo}$ and $\epsilon_t$ as a function of bore hole depth.

3. The method of claim 1 and further including the steps of:
   determining the porosity $\theta$ of the earth formations surrounding the bore hole as a function of bore hole depth; and
   combining the porosity and the indications of $\epsilon_{xo}$ and $\epsilon_t$ as a function of borehole depth according to a predetermined relationship to derive an indication of the percentage of movable hydrocarbon in the earth formations surrounding the well bore as a function of bore hole depth.

4. The method of claim 3 and further including the step of recording the indication of movable hydrocarbon as a function of borehole depth.

5. The method of claim 1 wherein the step of determining $R_{xo}$, $R_t$ and $d_i$ by conventional induction and resistivity well logs is performed by determining these quantities by use of a dual induction laterolog.

6. The method of claim 1 wherein the steps of measuring the relative phase shifts at said first and second radial depths of investigation are performed by measuring the relative phase shift of the electromagnetic waves between dual pairs of spaces receiver coils, a first receiver coil pair being longitudinally spaced at a first distance from a transmitter coil and a second receiver coil pair being spaced a second, longer distance from a transmitter coil.

7. The method of claim 6 wherein said first longitudinal distance is approximately 10 inches and said second longitudinal distance is approximately 30 inches.

8. The method of claim 7 wherein the radio frequency of operation is approximately 30 megahertz.

9. The method of claim 7 wherein said first receiver coil pair is spaced apart by a distance of approximately 6 inches and said second receiver coil pair is spaced apart by a distance of approximately 12 inches.

10. The method of claim 9 wherein the radio frequency of operation is approximately 30 megahertz.

11. A method for determining electromagnetic properties of conductive well fluid invaded earth formations in the vicinity of a bore hole, the formations comprising a radially invaded zone and an uninvaded zone, comprising the steps of:
   generating, in a well bore hole, a radio frequency electromagnetic field in the frequency range from 10–60 megahertz;
   detecting in said well borehole the relative phase shift of the radio frequency field at the generated frequency between the coils of a first relatively short spaced receiver coil pair and generating a signal $\theta_s$ representative thereof;
   detecting in said well borehole the relative phase shift of the radio frequency field at the generated frequency between the coils of a second relatively longer spaced receiver coil pair and generating and a signal $\theta_L$ representative thereof;
   determining by means of conventional low frequency induction and resistivity well logging techniques $R_{xo}$, the resistivity of the invaded zone, $R_t$, the resistivity of the uninvaded formation and $d_i$ the depth of invasion; and
   combining the $\theta_s$ and $\theta_L$ representative signals according to a predetermined relationship as a function of $R_{xo}$, $R_t$ and $d_i$ to derive indications of $\epsilon_{xo}$, the dielectric constant of the invaded zone and $\epsilon_t$, the dielectric constant of the uninvaded formation.

12. The method of claim 11 wherein the steps are performed continuously at a plurality of depths in the bore hole and signals representative of $R_{xo}$, $R_t$, $\epsilon_{xo}$, $\epsilon_t$ and $d_i$ are recorded as a function of bore hole depth.

13. The method of claim 11 and further including the steps of:
   determining the porosity $\phi$ of the earth formations surrounding the bore hole as a function of bore hole depth; and
   combining the porosity and the indications of $\epsilon_{xo}$ and $\epsilon_t$ as a function of bore hole depth according to a predetermined relationship to derive on indication of the percentage of movable hydrocarbon in the earth formations surrounding the well bore as a function of bore hole depth.

14. The method of claim 13 and further including the step of recording the indication of movable hydrocarbon as a function of bore hole depth.

15. The method of claim 11 wherein the step of determining $R_{xo}$, $R_t$ and $d_i$ is performed by the use of a dual induction laterolog well logging system.

16. The method of claim 11 wherein said first pair of receiver coils are spaced apart approximately 6 inches from each other.

17. The method of claim 16 wherein said second pair of receiver coils are spaced apart approximately 12 inches from each other.

18. The method of claim 17 wherein the nearest coil of said first receiver coil pair is spaced approximately 10 inches from said transmitter location.

19. The method of claim 18 wherein the nearest coil of said second receiver coil pair is spaced approximately 30 inches from said transmitter location.

20. The method of claim 19 wherein the frequency of operation is approximately 30 megahertz.

* * * * *